US005696829A

United States Patent [19]

Cordery et al.

[11] Patent Number: 5,696,829

[45] Date of Patent: Dec. 9, 1997

[54] DIGITAL POSTAGE METER SYSTEM

[75] Inventors: Robert A. Cordery, Danbury; Thomas A. D'Andrea, Middlebury; Jerome E. Jackson, Newtown; Wallace Kirschner, Trumbull; Richard A. Malin, Westport; David T. McPherson, Stamford; Edward J. Naclerio, Madison; Maria P. Parkos, Milford; John H. Steinmetz, Bridgeport; Joel I. Wald, Stamford, all of Conn.

[73] Assignee: Pitney Bowes, Inc., Stamford, Conn.

[21] Appl. No.: 560,253

[22] Filed: Nov. 21, 1995

[51] Int. Cl.[6] .............................. H04L 9/00; G07B 17/02; G07B 17/04; G06F 17/60

[52] U.S. Cl. ...................................... 380/55; 380/4; 380/9; 380/21; 380/23; 380/25; 380/29; 380/49; 380/51; 380/52; 364/464.11; 364/464.15

[58] Field of Search ........................... 364/464.02, 464.11, 364/464.15; 380/4, 9, 23, 25, 49, 51, 52, 55, 59, 21, 29

[56] References Cited

U.S. PATENT DOCUMENTS 4,809,185 2/1989 Talmadge ............................ 364/464.02

4,853,523 8/1989 Talmadge ........................ 364/464.02 X 4,858,138 8/1989 Talmadge ............................ 364/464.02

*Primary Examiner*—Bernarr E. Gregory

*Attorney, Agent, or Firm*—Steven J. Shapiro; Melvin J. Scolnick

[57] ABSTRACT

A mailing system is includes of a mailing machine operating under the control of a microcontroller having a communication port with a first channel and a second channel. The mailing system also includes a meter vault which operates under the control a microcontroller mounted in a secure housing and having a communication port with a first channel and a second channel. A printer is included which operates under the control of a microcontroller mounted in a secure housing and having a communication port having a first channel and a second channel. A printer interface is included for providing a number of independent communication paths. A first path provides communication between first channel of the mailing machine and the first channel of the meter vault. A second path provides communication between the second channel of the mailing machine and the second channel of the printer, and a third path for providing communications between the second channel of meter vault and the first channel of the printer.

7 Claims, 5 Drawing Sheets

DIGITAL POSTAGE METER SYSTEM

BACKGROUND OF THE INVENTION

The present invention relates to postage metering systems and, more particularly, to postage meters that include a printing system, accounting system and operator interface which are housed in a single housing.

A conventional postage meter system is comprised of a secure housing. The secure housing, as here used, refers to a housing which incorporates any number of tamper detection and printer protection features in an attempt to prevent unauthorized persons from gaining access to the system controllers in an attempt to fraudulent procure postage from the meter. In a further effort to prevent fraudulent procurement of postage, the meter control system conventionally interlaces to the accounting and the printing systems in order to provide further confidence that all postage printed by the printing unit is accounted for by the accounting system.

The process of interlacing the accounting and the printing system has performed well for conventional mechanical and electro-mechanical systems. However, the introduction of digital printing technologies has prompted a desire to utilize such technologies, for example, thermal transfer, various types of ink-jet technologies and laser. In exploring use of such digital printing technologies, it was determined, that unlike the conventional mechanical and electro-mechanical printing system, the printer control system and interface requirement vary substantially depending on the digital printing technology desired to be employed. Therefore, as a consequence of control interlacing, application of the digital printing technologies to a range of various postage meter models would necessitate a plurality of model specific postage meter electronic control systems to accommodate the interlacing of various accounting and printer systems.

For example, a known postage meter utilizes thermal printing technology. The postage meter is under the control of a microcontroller system comprised of a main board, on which resides the microprocessor, program memories, non-volatile accounting memories, and control ASIC (application specific integrated circuit), a power supply board and a input-output board. The ASIC includes a number of control modules which are responsible for providing, among other things, accounting for postage expended, access and protection to the non-volatile accounting memories, and construction of the fixed and variable information necessary to form an indicia and communication of the constructed bit-mapped data to the thermal print head driver in the required protocol. The control modules of the ASIC are electronically interlaced within the ASIC to assure that any funds expended for postage as printed by the thermal print head is accounted for. It should be noted that the thermal printer print head is secured within the housing of the postage meter. It can now be appreciated any change in the printing protocol, necessitated by either a different thermal printer system or transition to a different digital printing technology, requires some accommodating changes in the ASIC.

A known postage meter control system, such as, the Pitney Bowes' Post Edge thermal printing postage meter, includes a novel ASIC design which permits some ASIC programmability by incorporating data registers within the ASIC which permit some alteration of various critical control parameters of select ASIC control modules to allow the use of the ASIC with other postage meter models. However, this innovation has two limitations. The first limitation is occasioned wherein the required protocols and/or ancillary data necessary to control the printer can not be accommodated by the ASIC. A second limitation is that, in the interlacing of accounting and printing control remains. It is also required that the meter housing continue to provide tamper security to the meter control system.

SUMMARY OF THE INVENTION

It is an objective of the present invention to present a postage meter control system wherein the accounting system of a postage meter is indifferent to the printing technology utilized by the postage meter to print the postage indicia and still maintains system security.

It is a still further objective of the present invention to present a postage meter control system wherein the postage meter can be interfaced to a mail piece transport system in a manner in which the transport control system is independent of the postage meter and printer control systems.

A postage meter system in accordance with the present invention includes a base unit, more commonly referred to as a mailing machine, which serves as a platform for the meter unit. The bases includes a microcontroller system which is responsible for controlling the transportation of envelopes in a sequential manner to a printing location whereat the printing unit can print an postage indicia and any other additional information, such as, an ad slogan, delivery address or bar code on the envelope in a preferred configuration, it is contemplated that printing will accrue during relative motion between the envelope and the printing unit associated with the meter. Therefore, the microcontroller system in the base will be responsible for relatively precise control of the motion of the envelope through the printing location.

The meter unit is comprised of two independent units which are a vault and a printer. The vault accounts for and dispenses funds for postal payment. Communication between the mailing machine, vault and printer is facilitated through a printer interface unit. The meter vault communicates with the print head to transfer encrypted messages for postage amount, piece count, and digital tokens. A digital token represents an alphanumeric sequence generated by using any suitable algorithm which uniquely identifies the postage indicia as originating from a particular postage meter system and verifying that that postage meter system is authorized for use by the Postal Authorities. Meter vault communications are routed to the print head through the printer interface. The meter vault securely communicates with the print head using any suitable digital encryption technique.

The printer interface serves as a junction board for the mailing machine, meter vault, graphics interface box, and print head. This minimizes the number of connection points in the system. The printer interface provides the connections for a serial communication linkage and unregulated DC power from the mailing machine to the meter vault, transfers print command and status signals between the mailing machine and print head, interfaces the graphics interface box to the print head, supports a unique serial link between the meter vault and print head, and regulates logic and print nozzle power from the mailing machine to the print head.

The graphics interface box stores graphics images representing the fixed part of the standard indicia (e.g., the eagle printed on US mail), low-value indicia, permit mail indicia, town circle (where appropriate), inscriptions, and customer slogans. It also stores the fonts for printing the variable data on the mail piece. All of the graphics data is either encrypted or signed, i.e., subject to other types of encoding algorithms in the graphics interface box non-volatile memory. The encryption or signing is done at the manufactures facility. Only the print head contains the necessary decryption key to properly interpret the data.

The communication by the meter vault includes encrypted information. Only the meter vault and the print head know the proper keys to utilize the information. The keys are stored in an ASIC on the print head to reduce the opportunity for fraud. The microcontroller on the print head controls the printing operation including loading of NVM, decoding of messages with assistance of a DES engine on the print head ASIC, and initiating of printing. The microcontroller helps to reduce the complexity of the ASIC.

The print head ASIC decodes the mail position for printer sequencing, provides the proper timing for driving the print nozzles, supports external ink supply monitoring, interfaces to the NVM; supports external communications, and performs self-test functions. The print head NVM also stores inscription representations. The meter vault stores a table of enabled inscriptions. When the operator at the mailing machine wishes to select an inscription, the print head transfers a list of the available options to the meter vault. The vault screens for only the enabled inscriptions and sends the information to the mailing machine. The operator's response is forwarded from the meter vault to the print head.

It should now be appreciated that critical data which is transmitted from the meter vault to the print head is secured utilizing encoding. Further the process architecture described removes the interlacing between the meter vault and printing system such that the printing process control in totally independent of the meter vault accounting process, thereby, allowing the use of any printing technology independent of meter vault security.

DETAILED DESCRIPTION OF THE PREFERRED EMBODIMENT

Figure 1:
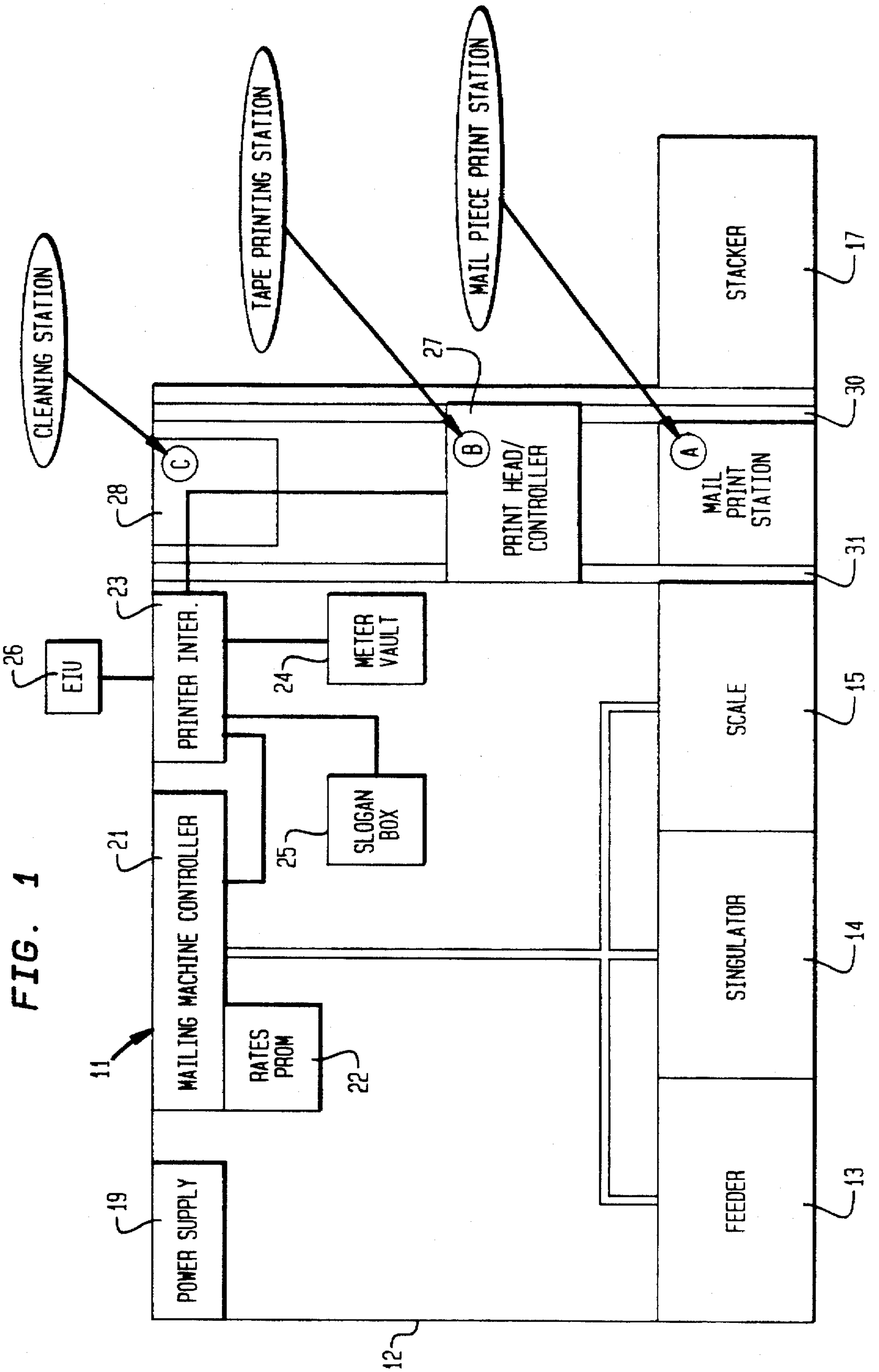
FIG. 1 is a schematic of a postage metering system in accordance with the present invention.

Referring to FIG. 1, the postage meter system, generally indicated as 11, includes a mailing machine base 12. The mailing machine base 12 is of any suitable conventional design and, in the preferred embodiment, includes a feeder section 13, singulator 14 and scale section 15 positioned serially along a mail flow path. Following the scale section 15 is a print station at location A which is followed by a stacker 17. Any suitably designed feeder section 13, singulator section 14, scale section 15 and stacker section 17 may be used. The operation of the respective section 13, 14, 15, and 17 is under the control of a mailing machine controller 21. Power to the system is provided by a conventional power supply 19. It should be appreciated that the mailing machine controller 21, in the preferred embodiment, will control such additional functional system as the operator keyboard and display, unsecured departmental accounting (not shown) and other convention system functions. As depicted in FIG. 1, a rates programmable read only memory (PROM 22) is detachable mounted to the mailing machine controller 21 to provide rate information to the mailing machine controller in any suitable conventional manner.

Also, housed in the mailing machine is a printer interface 23, graphics interface box 25, meter vault 24 and print head/controller 27, hereafter referred to as print head 27. The print head 27 (second occurrence) includes a housing **27*a* which is mounted to a rails 30 and 31 by any suitable means to be positionable, by any convention means such as by a motor (not shown) between a first position "A" which is the print position, a second position "B" which is a tape print position, and a third position "C" which is a cleaning position. At position "C" the print head 27 is brought into contact with a nozzle cleaning system of any suitable design such that, for example, wherein ink jet print technology is utilized by the print head 27, the nozzles may by cleaned. The positioning of the print head 27 along the rails 30 and 31** is under the control of the mailing machine controller utilizing any suitable conventional control means.

Also, the mailing machine 12 includes provisions for allowing the external interface of an external interface unit (EIU 26) to the printer interface 23 by any conventional means. The EIU 26 provides additional microprocessing functionality and peripheral interfacing to the system 11 utilizing any suitable method.

Figure 2:
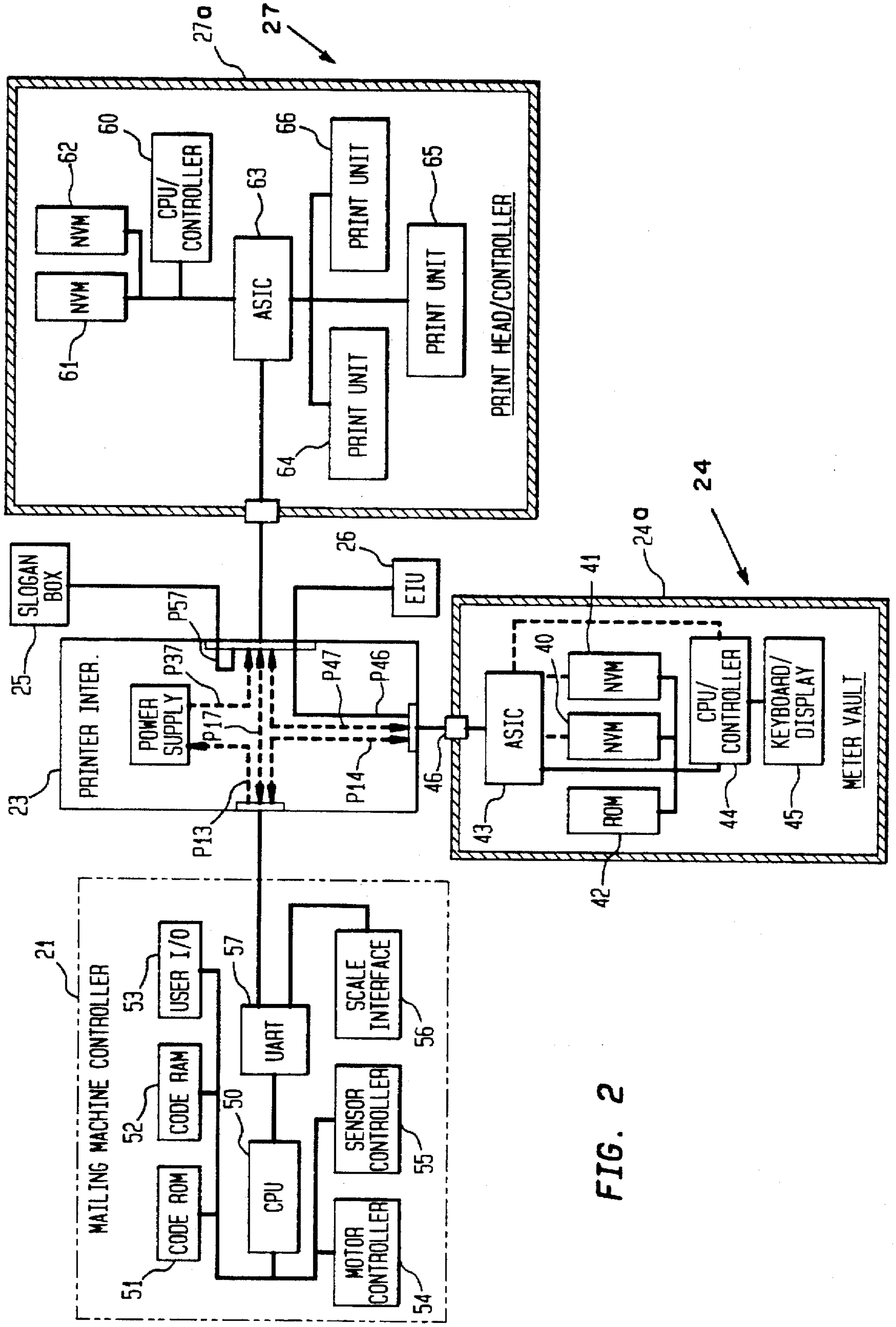
FIG. 2 is a schematic illustration of the communication path between the meter vault, mailing machine and print head units and of the respective control systems in accordance with the present invention.

Referring to FIG. 2, the meter vault 24 includes secures housing **24*a*, a funds accounting memory 40 and 41, program memory 42, ASIC 4, CPU controller 44, and keyboard/display 45. As more specifically described subsequently, the ASIC 43 provides two RS-232 communications ports 46 in any suitable conventional means for facilitating communications with the mailing machine 21 and the printhead 27**.

The communication port 46 is modified to include an extra pin for receiving DC power from the mailing machine. It should be appreciated that the keyboard and display 45 is provided an operator or postal agent a means of recharging the accounting registers of the accounting memory 40 and 41 through the keyboard in any suitable conventional manner.

The mailing machine controller 21 is comprised of a controller CPU 50, code ROM 51, code RAM 52, user input/output 53, motor controller 54, sensor controller 55. Also provided is a scale interface 56 and UART interface 57. The UART interface 57 is of any conventional design for allowing asynchronous serial communication. Of principle concern to the preferred embodiment of the present invention is that the UART interface 57 facilities communication between the mailing machine controller 21 and the other system units 23, 24, 25, 26 and 27.

The print head 27 is comprised of a CPU controller 60, nonvolatile memory units 61 and 62, ASIC 63 and print units 64, 65, 66. In the preferred embodiment it is contemplated to use multiple ink jet printing units.

Meter vault 24 communications to the print head 27 are routed through the printer interface 23 along communication path P47. The meter vault 24 securely communicates with the print head 27 using DES encryption. A number of encryption keys are preloaded into the ASIC's 63 of the print head 27 and ASIC 43 of the meter vault 24. This will make discovering the keys impossible without reverse engineering of the ASIC's 43 or 63. Communications path 47 is also used to select inscriptions and slogans in conjunction with the graphics interface box 25. A printer interface path P46 provided for electrical communication with the EIU 26. As aforenoted, the EIU 26 represents an external unit which can be attached to the meter vault 24 to provide enhanced capability to the meter vault 24.

The printer interface 23 serves as a junction board for the mailing machine 21, meter vault 24, print head 27 and a graphics interface box 25. By providing specific communication path P13, P14, P17, P37, P46, P47, P57 within the printer interface 23, the individual subsystems can be isolated in such a manner to remove the necessity for interdependent security measures.

The graphics interface box 25 stores graphics images representing the fixed part of the standard indicia (e.g., the eagle printed on US mail), low-value indicia, permit mail indicia, town circle (where appropriate), inscriptions, and slogans. It also stores the fonts for printing the variable data on the mail piece. All of the graphics data is either encrypted or signed in the graphics interface box 25 non-volatile memory (not shown). Only the print head 15 contains the necessary decryption key to properly interpret the data. Because of the different indicia formats, each country will have its own indicia graphics, therefore its own graphics interface box 27 product code number.

When a new print head 27 is positioned or installed in the mailing machine 17, the controller 27 checks the local NVM 61 and 62; if it is un-initialized, the controller reads the graphics interface box to retrieve the necessary graphics information. The print head decrypts or verifies this data and programs it into its NVM 61 and 62. In the event that the print head NVM 61 and 62 are smaller than the graphics interface box NVM, only the subset of graphics necessary for a particular mail run is loaded into the print head NVM 61 and 62. If the NVM 61 and 62 should become corrupted, e.g., fail a checksum test, the controller 60 can request a new memory download as though it were newly installed.

When the mailing machine 21 initiates the meter ad selection option as a result of operator selection via the user I/O 53. The graphics interface box 25 will transfer a text description of each of its slogans to the mailing machine 21 through the print head 27 and meter vault 24. Once the operator responds with the selected slogan to print by selection of the appropriate operator key on the mailing machine 21, the graphics interface box 25 transfers the bit-map slogan image to the print head 27 if it is not already loaded in the print head NVM 61 and 62. The graphics interface box 25 electrically connects to the print head 27.

The print head 27 prints the indicia including postage amount, digital tokens, piece count, and date as well as an optional inscription and slogan on each mail piece. The fixed part of the image, fonts for the variable parts of the image, and inscription bit-maps are programmed into the print head's NVM 61 and 62 when the print head is first installed in the mailing machine 17. The meter vault 24 will send a message to the print head indicating the format of the town circle. The print head obtains the town circle information as either a text string from the meter vault or a bit map from the graphics interface box and programs its NVM with the data. For each mail piece, the meter vault 24 transfers the variable indicia information such as the postage amount, digital tokens, meter serial number, and piece count to the print head. The print head controller 60 programs registers (not shown) in the ASIC 63 with this information. When the mailing machine 21 commands the print head to print, the ASIC 63 combines the fixed and variable parts of the image for printing by the print units 64, 65 and 66 utilizing any suitable technique.

The interface with the meter vault 24 includes encrypted information; only the meter vault 24 and the print head 27 know the proper keys to utilize the information. The keys are stored in an ASIC 63 on the print head 27 and the meter vault ASIC 43.

The controller 60 on the print head controls the printing operation including loading of NVM 61 and 62, decoding of messages and initiating of printing.

The print head ASIC 63 also decodes the mail position for printer sequencing, provides the proper timing for driving the print nozzles, supports external ink supply monitoring, interfaces to the NVM 61 and 62; supports external communications, and performs self-test functions. The print head NVM 61 and 62 also stores inscription representations. The meter vault 24 stores a table of enabled inscriptions. When the operator at the mailing machine 21 wishes to select an inscription, the print head transfers a list of the available options to the meter vault. The vault screens for only the enabled inscriptions and sends the information to the mailing machine 21. The operator response is forwarded from the meter vault 24 to the print head 27.

Figure 3:
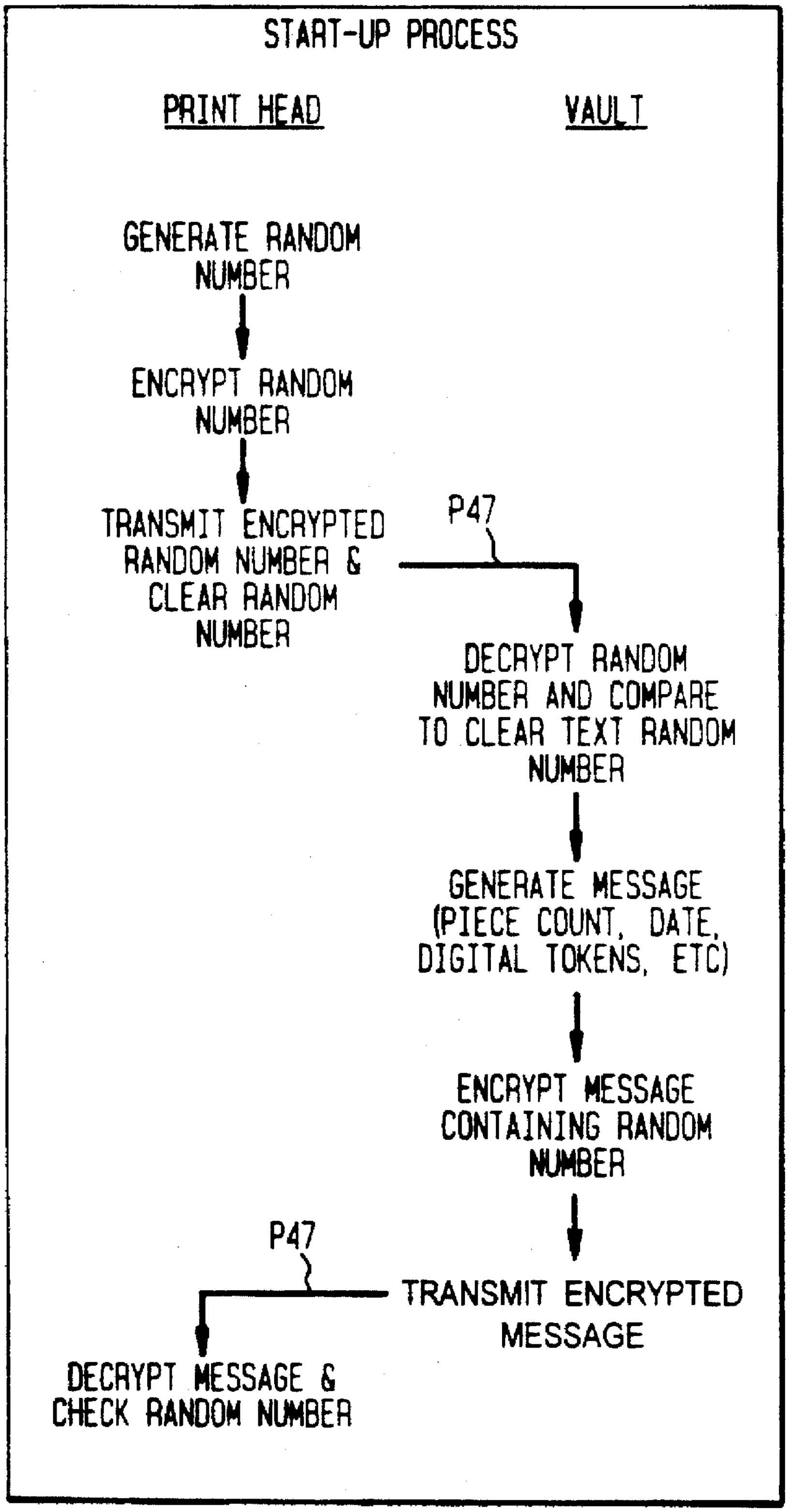
FIG. 3 is a process diagram of the start-up process of the postage meter system in accordance with the present invention.
Figure 4:
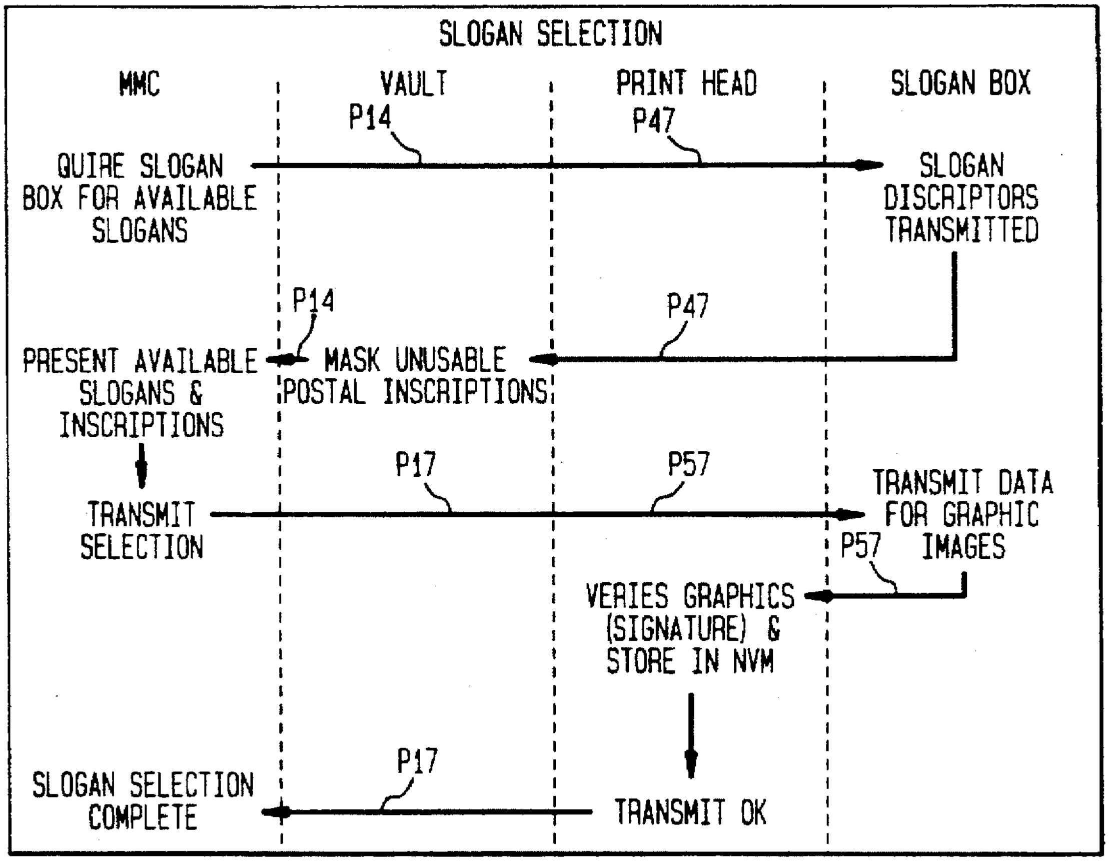
FIG. 4 is a process diagram of the slogan selection process of the postage meter system in accordance with the present invention.
Figure 5:
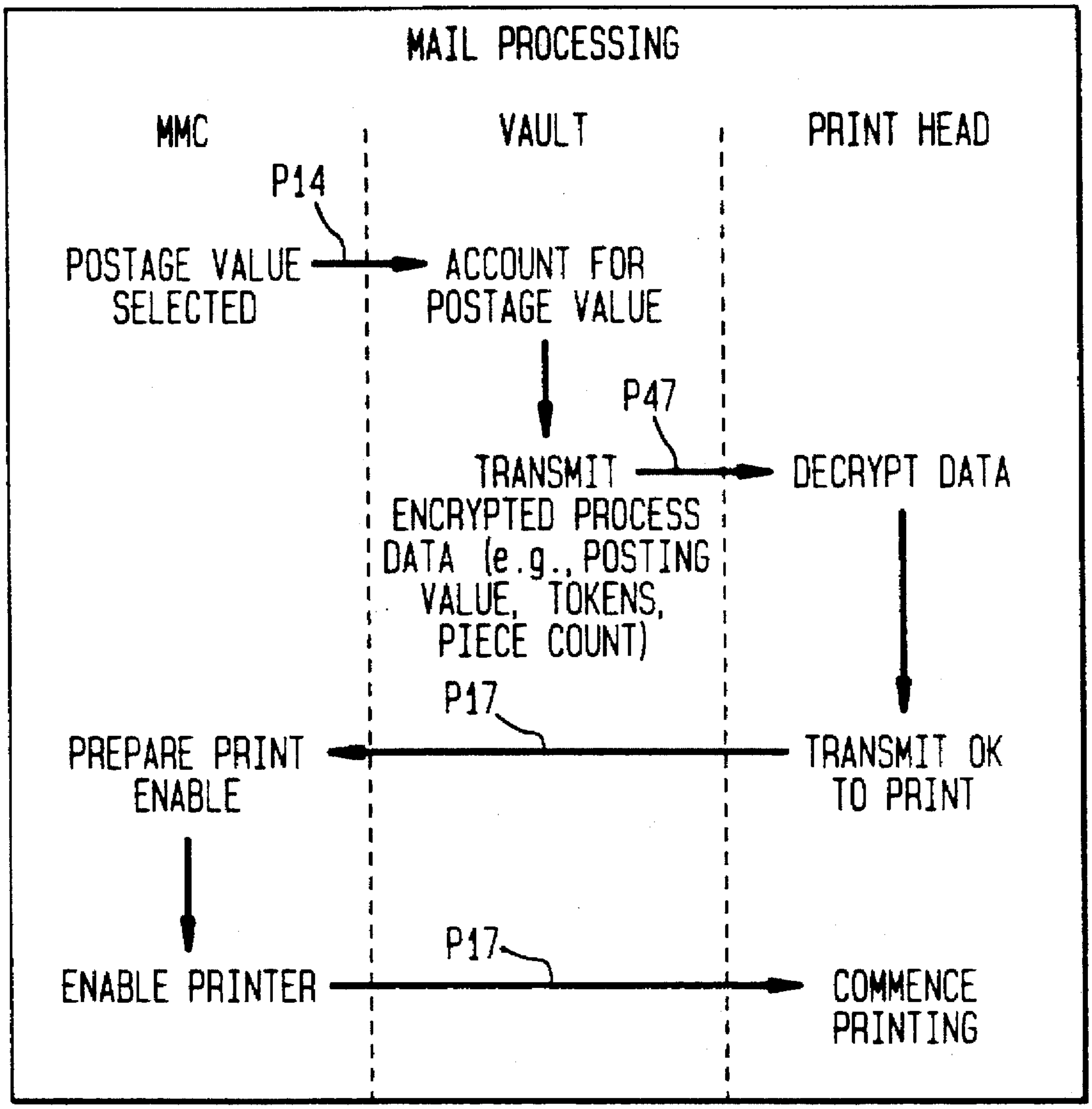
FIG. 5 is a process diagram for mail processing of the postage meter system in accordance with the present invention.

Referring also to FIG. 3, 4 and 5, it is observed that the meter vault 24 may have any suitable know independent housing and internal security measures as well as the print head 27 may like-wise have independent housing and any suitable internal security since critical communication between the mailing machine controller 21, meter vault 24 and print head 27 are secure communications. Particularly, referring to FIGS. 3, 4 and 5, during the system start-up process, the print head 27 generates a random number which is then encrypted by the ASIC 63. The random number is transmitted via path P47 in the encrypted and clear form to the meter vault 24. The meter vault 24 decrypts the random number and compares with the clear text. If a match is determined, then the meter vault 24 generates a message of critical data including the random number. The meter vault message is encrypted and transmitted along path P47 to the print head 27. The message is then decrypted and, if the random number transmitted matches the generated random number, the encrypted information is store in the NVM's 61 and 62 for use in subsequent printing.

Particularly referring to FIG. 4, in the manner described above, an operator may submit a request to the graphics interface box 25 transmit the slogan descriptor paths P14 and P47. The slogan box 25 transmit the slogan descriptor information via path 47 to the meter vault 24 which mask the unusable postal inscriptions. The meter vault 24 than relays the modified message to the mailing machine controller 21 for presentation to requester. The requester then makes a selection which the mailing machine controller 21 transmit via path P17, P57 to the graphics interface box 25. The graphics interface box 25 then transmits the data for the graphic image via path P57 to the print head 27 which stores the graphic information in the memories 61 and 62. The print head 27 then transmits via path P17 an information received to the mailing machine controller 21.

Referring now to FIG. 5, to process mail items, a postage value is either operator selected or determined based upon data from the scale 15 via the scale interface 56. The mailing machine controller 21 transmits the appropriate postage value to the meter vault 24 via path P14 which then accounts for the postage value. The meter vault 24 then encrypts the critical accounting data and transmits the encrypted data via path P47 to the print head 27 where the data is decrypted. Once the data is successfully decrypted, the print head 27 transmits an OK to print to the mailing machine controller 21 via path P17. Upon receipt of the OK message from the print head 27, mailing machine controller 21 then transmits along path P17 a print enable and printing is commenced.

It should now be appreciated that the afore described system provides the benefit of unlacing system security and provides a method of generating secure communications between system units.

What is claimed is:

1. A postage meter mailing system, comprising:

a mailing machine including a microcontroller having a communication port having a first channel and a second channel, a meter vault including a microcontroller mounted in a secure housing and having a communication port having a first channel and a second channel, a printer including a microcontroller mounted in a secure housing and having a communication port having a first channel and a second channel, a printer interface means for providing a plurality of independent communication lines to permit communication between said printer, said mailing machine and said meter vault, said communication lines being a first communication line connecting said first channel of said mailing machine to said first channel of said meter vault permitting communication therebetween, a second communication line connecting said second channel of said mailing machine to said second channel of said printer permitting communication therebetween, and a third communication line connecting said second channel of said meter vault to said first channel of said printer permitting communication therebetween.

2. A postage meter mailing system as claimed in claim 1 wherein said microcontroller of said printer includes means for generating a random number, and means for encrypting.

3. A postage meter mailing system as claimed in claim 2 wherein upon start-up of said system said microcontroller of said printer includes means for 1) causing said means for generating a random number to generate a random number and storing said random number, 2) causing said encryption means of said printer to encrypt said random number and 3) transmitting said encrypted random number and said random number to said meter vault by said third communication line of said printer interface means;

said microcontroller of said meter vault having means for decrypting said encrypted random number, for comparing said random number with said decrypted random number, and for generating a message if said comparison is true; said microcontroller of said meter vault having means for encrypting said message and for re-encrypting said random number and having means for transmitting said encrypted message and said re-encrypted random number to said printer by said third communication line of said printer interface means; said microcontroller of said printer having means for decrypting said message and said re-encrypted random number and having means for comparing said decrypted re-encrypted random number with said stored random number and for storing said decrypted message if said comparison is true.

4. A postage meter mailing system as claimed in claim 3 wherein said microcontroller of said mailing machine includes input means for selecting a postage value to be printed by said printer and for transmitting said postage value to said microcontroller of said meter vault by said first communication line of said printer interface means; said microcontroller of said meter vault having means for accounting for said postage value and for encrypting a second message including said postage value and for transmitting said second message to said printer by said third communication line of said printer interface means;

said microcontroller of said printer having means for decrypting said second message and for transmitting a printer "OK" message to be said microcontroller of said mailing machine by said second communication line of said printer interface means;

said microcontroller of said mailing machine having mean for receiving said "OK" message and for transmitting a print enabling signal to said microcontroller of said printer by said second communication line of said printer interface means.

5. A postage meter mailing system as claimed in claim 4 further comprising:

a graphics interface box having means for storing a plurality of slogan messages and third messages;

said graphics interface box having controller means including a communication port having a channel;

said printer interface means having a fourth communication line connecting said channel of said graphics interface box controller means and said first channel of said printer to permit communication therebetween;

said mailing machine having means for generating a slogan query message and for transmitting said slogan query message to said meter vault by said first communication line of said printer interface means;

said microcontroller of said meter vault having means for relaying said slogan query message to said microcontroller of said printer by said third communication line of said printer interface means;

said graphics interface box controller means having means for receiving said slogan query message and for generating a plurality of slogan descriptors corresponding to respective one's of said slogan messages and third messages descriptors corresponding to respective one's of said third messages and for transmitting said slogan descriptors along with said third messages descriptors to said microcontroller of said printer;

said microcontroller of said printer having means for relaying said slogan descriptors and said third messages descriptors to said microcontroller of said meter vault by said third communication line of said printer interface means;

said microcontroller of said meter vault having means for selectively identifying pre-selected ones of said third messages descriptors and having means for relaying said slogan descriptors and said third messages descriptors excluding said pre-selected ones to said microcontroller of said mailing machine by said first communication line of said printer interface means;

said microcontroller of said mailing machine having means for selecting one of said slogan descriptors and one of said third messages descriptors excluding said preselected ones to be printed and for transmitting said selected slogan descriptor and said selected third messages descriptor to said microcontroller of said printer by said second communication line of said printer interface means;

said microcontroller of said printer having means for relaying said selected slogan descriptor and said selected third messages descriptor to said graphics interface box by said forth fourth communication line of said printer interface means; said controller means of said graphics interface box having means for transmitting said slogan message corresponding to said selected slogan descriptor and said third message corresponding to said third messages descriptor to said printer by said fourth communication line of said printer interface means;

said microcontroller of said printer having means for storing said slogan message corresponding to said selected slogan descriptor and said third message corresponding to said third message descriptor and transmitting a "Selection Complete" message to said microcontroller of said mailing machine by said second communication line of said printer interface means.

6. A postage meter mailing system as claimed in claim 4 further comprising:

an external interface unit having a microcontroller for providing additional data process and postage meter mailing machine functions and including a communication port having communication channel;

said printer interface means having a fifth connecting said second channel of said meter vault and said communication channel of said external interface unit to permit communication therebetween.

7. A postage meter mailing system as claimed in claim 1 further comprising:

an external interface unit having a microcontroller for providing additional data process and postage meter mailing machine functions and including a communication port having a communication channel;

said printer interface means having a fifth communication line connecting said second channel of said meter vault and said communication channel of said external interface unit to permit communication therebetween.

* * * * *